United States Patent [19]
Wu

[11] Patent Number: 5,951,218
[45] Date of Patent: Sep. 14, 1999

[54] KEY DUPLICATING MACHINE

[76] Inventor: Kuo-Shen Wu, No. 10, Alley 14, Lane 74, Pa Ta Road, Section 3, Taipei, Taiwan

[21] Appl. No.: 09/026,964

[22] Filed: Feb. 20, 1998

[51] Int. Cl.[6] ..................................................... B23C 3/35
[52] U.S. Cl. ............................................. 409/81; 76/110
[58] Field of Search ................................ 409/81, 82, 83; 76/110

[56] References Cited

U.S. PATENT DOCUMENTS

| | | | |
|---|---|---|---|
| 1,978,628 | 10/1934 | Hansen | 409/81 |
| 3,138,999 | 6/1964 | Haggstrom | 409/83 |
| 3,919,920 | 11/1975 | Schlage | 409/82 |
| 4,521,142 | 6/1985 | Juskevic | 409/82 |
| 4,526,498 | 7/1985 | Fieldhouse | 409/82 |
| 4,614,465 | 9/1986 | Wu | 409/81 |
| 5,128,531 | 7/1992 | Fadel | 409/83 |

FOREIGN PATENT DOCUMENTS 658094  1/1995  Australia.

*Primary Examiner*—William Briggs
*Attorney, Agent, or Firm*—Ladas & Parry

[57] ABSTRACT

A key duplicating machine comprising a rotating cutting tool directly secured on an output shaft of a driving motor; a duplicating stylus secured on a rack means secured on a substrate; a pair of clamping devices for clamping a key blank and a key sample, secured on a rectangular base releasably secured on an upper slide slidably secured on a lower slide slidably secured on said substrate; a compression spring arranged between said upper slide and a rear wall of said lower slide for constantly forcing said key blank to move toward and touch said rotating cutting tool for effecting a steady key cutting.

6 Claims, 6 Drawing Sheets

KEY DUPLICATING MACHINE

BACKGROUND OF THE INVENTION

The present invention relates to a key duplicating machine, and more particularly to an improved key duplicating machine having a rotating cutting tool directly secured on an output shaft of a driving motor, a duplicating stylus arranged on a rack means and can be adjusted by hand; a pair of clamping devices secured on a rectangular base releasably secured on an upper slide slidably secured on a lower slide slidably secured on a substrate; and a compression spring arranged between the upper slide and the rear wall of the lower slide for forcing a key blank to move towards and touch a rotating cutting tool for effecting the key cutting.

Conventional key duplicating machine has the following disadvantages:

The cutting tool is driven through an intermediate belt and pulley assembly by the output shaft of a driving motor. This will increase not only the number of the parts, but also the transmission friction loss.

The duplicating stylus can only be adjusted by a tool e.g. a driver or a spanner, and hence it is inconvenient to the user.

The clamping device is stationarily provided on the duplicating machine, and can only be used to clamp a specific type of the key.

The key cutting is effected by means of the hand strength control, i.e. the hand is used to manipulate the clamping device in order to urge a key blank clamped on the clamping device to move towards and touch a rotating cutting tool for effecting the key cutting. In such a key cutting, it is not easy for a new hand to control the strength because improper exertion of the strength on the clamping device will result in an inaccurate key cutting, i.e. inaccurate depths of the formed key teeth. Hence, such a duplicating machine is merely suitable for an old hand, and not for a new hand.

Briefly, the present invention aims at eliminating the above disadvantages and provides an improved key duplicating machine which is suitable both for a new hand and an old hand, and having a rotating cutting tool which is directly secured on the shaft of a motor without an intermediate belt and pulley assemble; a duplicating stylus which can be adjusted by hand; a pair of clamping devices for clamping a key blank and a key sample, which is releasably secured through a rectangular base by means of the bolts, and hence it can be removed from the duplicating machine, and other different type of the pair of the clamping devices can be used to replace the removed one; and a compression spring arranged for constantly forcing the key blank to move toward and touch the rotating cutting tool for effecting the key cutting, without hand strength control.

In one aspect of the present invention, the improved key duplicating machine comprises a rotating cutting tool directly secured on an output shaft of a driving motor; a duplicating stylus secured on a rack means secured on a substrate, and can be adjusted by hand; a pair of clamping devices for clamping a key blank and a key sample, secured on a rectangular base formed in a flat plate for partial engagement with a slot formed on an upper slide, and releasably secured on the said upper slide slidably secured on a lower slide slidably secured on the said substrate; a compression spring arranged between the said upper slide and the rear wall of the said lower slide for constantly forcing a key blank to move toward and touch the said rotating cutting tool for effecting the key cutting.

In another aspect of the present invention, the improved key duplicating machine comprises a rotating cutting tool directly secured on an output shaft of a driving motor; a duplicating stylus secured on a rack means secured on a substrate, and can be adjusted by hand; a pair of clamping devices for clamping a key blank and a key sample, secured on a rectangular base formed in a flat plate for partial engagement with a slot formed on an upper slide, and releasably secured on the said upper slide slidably secured on a lower slide slidably secured on the said substrate; a compression spring arranged between the said upper slide and the rear wall of the said lower slide for constantly forcing a key blank to move toward and touch the said rotating cutting tool for effecting the key cutting; and a lead screw and nut assembly comprising a lead screw connected at one end to a hand wheel horizontally rotatably secured on a support secured on a vertical support of the said rack means, and a nut threadedly engaged with the said lead screw, and releasably secured on a vertical wall of a L-shaped member secured on a right side of the said lower slide, for driving the said key blank to move leftward or rightward by rotation of the said hand wheel to effect a steady key cutting.

Preferably the key duplicating machine further comprises a spring retainer provided between the said upper slide and the said lower slide, and comprising a retaining rod formed in a lever, and slantingly downward pivotally secured on a right side of the said upper slide, and having a downward recess formed on a front portion thereof for engagement with a stud secured on the said right side of the said upper slide by means of a torsion spring provided on a pivot of the said retaining rod, and having one end hooked at a rear potion of the said retaining rod and the other end hooked at the said stud; and a retaining plate secured on the said right side of the said lower slide, and having an upward protrusion formed on the top thereof for locking a hook formed at the front end of the said retaining rod when the said upper slide together with the said retaining rod is moved rearward by turning the said handle in a clockwise direction until the said hook has been raised by the said protrusion and fallen into a space behind the said protrusion, in order to enable the said upper slide to move to a non-cutting position.

BRIEF DESCRIPTION OF THE DRAWINGS

An embodiment of the present invention will now be described by way of example with reference to the accompanying drawings in which.

DETAILED DESCRIPTION OF THE INVENTION

Figure 1:
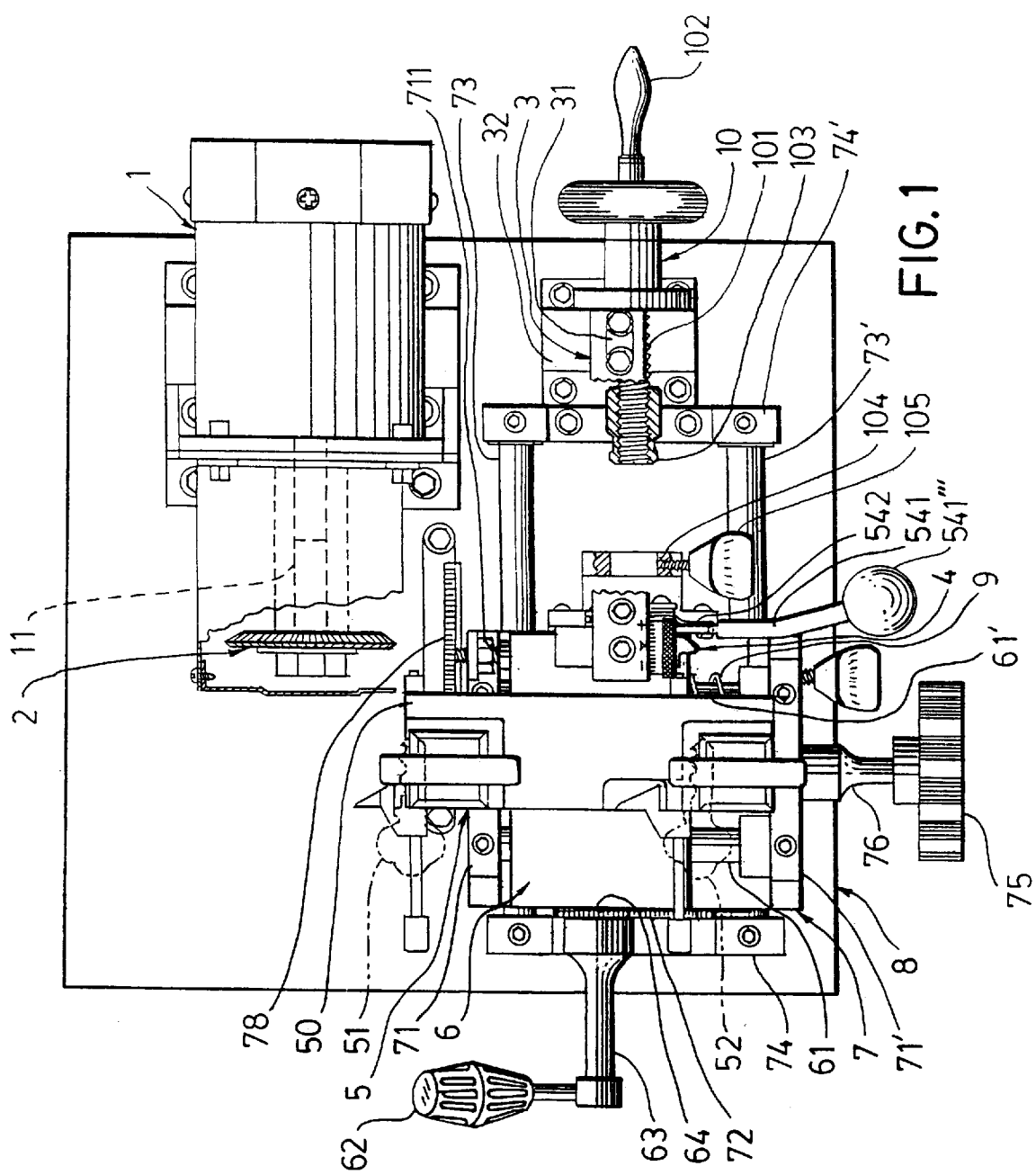
FIG. 1 is a partial sectional top view of an embodiment of an improved key duplicating machine in accordance with the present invention in which a pair of clamping devices has been moved to a non-cutting position.

Referring to FIGS. 1–7, the improved key duplicating machine in accordance with the present invention primarily comprises a driving motor 1, a rotating cutting tool 2, a rack means 3, a duplicating stylus 4, a pair of clamping devices 5, an upper slide 6, a lower slide 7, a substrate 8, a compression spring 9, and a lead screw and nut assembly 10 etc. The driving motor 1 is a prior known induction motor having an output shaft 11 which can rotate at 1,300 rpm, for directly driving the rotating cutting tool 2 which is a disk cutter, and directly secured on the output shaft 11, without the use of an intermediate belt and pulley assembly. This will decrease not only the number of the parts, but also the transmission friction loss. The rack means 3 is formed in a rectangular rod, and provided with an elongated elliptical counter-boring 31 at one end thereof for securing on a vertical support 32 in a cantilever in a direction parallel to the output shaft 11, by means of a pair of screws. The duplicating stylus 4 is provided at the other end of the rack means 3, and is a prior known stylus which can be finely adjusted by the user's finger without the use of additional tools e.g. driver or spanner, and disclosed in my Australian Patent No. 658094, titled as "Manual Fine Adjustment Stylus for Key Duplicating Machine".

The pair of the clamping devices 5 are of a prior known device, and secured at the two ends of a rectangular base 50. One of the clamping devices is used for clamping a key blank 51, and the other is used for clamping a key sample 52. The rectangular base 50 is formed in a flat plate for partial engagement with a slot 60 formed on the upper slide 6 (see FIG. 2), and provided with a counter-boring 501 at the center portion thereof for releasably securing on the bottom of the slot 60 of the upper slide 6 by means of a bolt 53. By the withdrawal of the bolt 53, the whole pair of the clamping devices 5 together with the rectangular base 50 can be removed from the upper slide 6, and hence other different type of the pair of the clamping devices can be used to replace the removed pair of the clamping devices if desired.

The upper slide 6 is formed in a rectangular block, and slidably engaged with the two horizontal parallel spaced guide posts 61 and 61' which are horizontally longitudinally secured between the front and rear walls 71 and 71' of the lower slide 7 formed in a substantial U-shape, in order that the upper slide 6 can be moved forward and rearward between the front and rear walls 71 and 71' by means of a handle 62 which is vertically secured onto one end of a horizontal lateral spindle 63 which is stationarily connected at the other end to the left side of the upper slide 6, and provided with a gear 64 which is matched with a rack 72 which is mounted on the left side of the lower slide 7. The lower slide 7 is slidably engaged with the two horizontal parallel spaced guide posts 73 and 73' which are horizontally laterally secured between the left vertical support 74 and the right vertical support 74' which are parallelly spaced and mounted on the substrate 8, so that the lower slide 7 can be moved leftward or rightward between the left vertical support 74 and the right vertical support 74' by turning a handle wheel 75 in a counter clockwise direction or a clockwise direction. The handle wheel 75 is secured at the rear end of a horizontal longitudinal spindle 76 which is rotatably supported between the front and rear walls 71 and 71' through bearings (not shown), and provided at its front end which extends from the front wall 71, with a gear 77 which is matched with a rack 78 which is mounted on the substrate 8.

Figure 4:
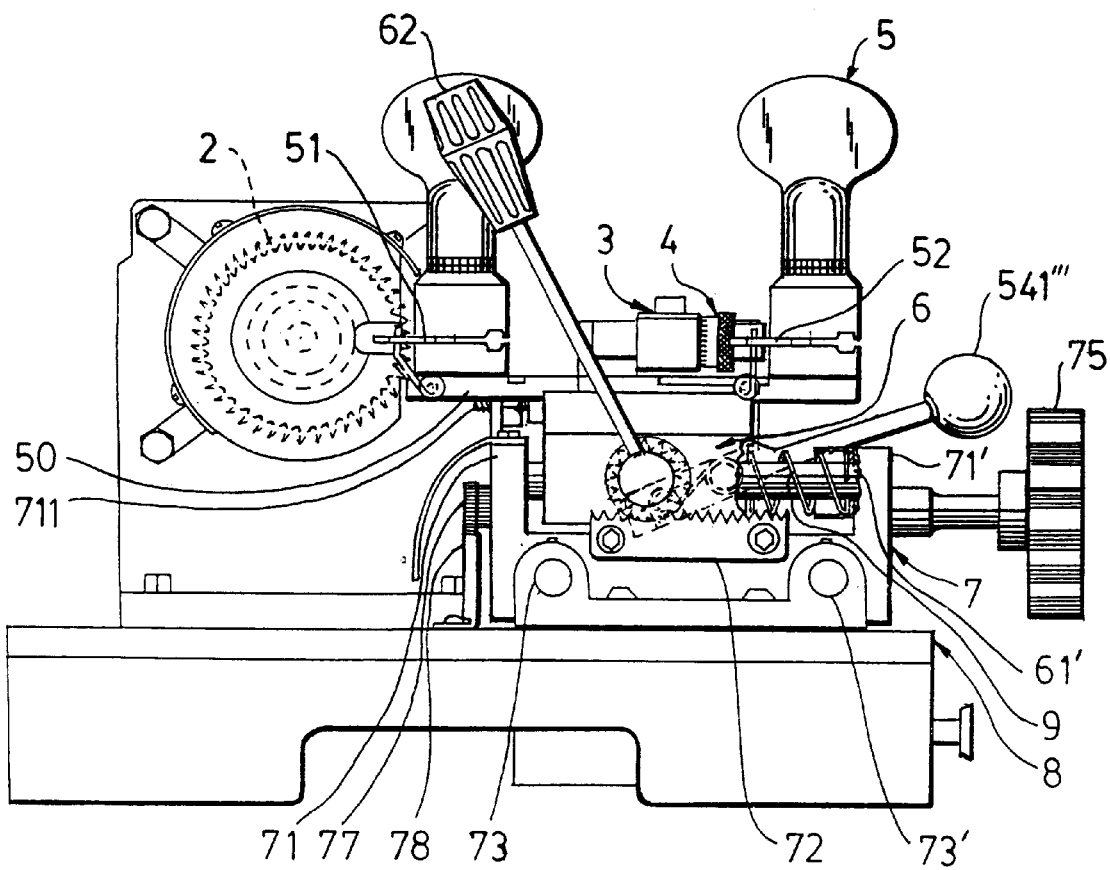
FIG. 4 is a partial sectional left side view of FIG. 1 in which a pair of clamping devices has been moved to a cutting position.

A compression spring 9 is provided between the upper slide 6 and the rear wall 71' of the lower slide 7, through which the guide post 61' penetrates, for constantly forcing the upper slide 6 to move to a duplicating position (as shown in FIG. 4) in which a key blank 54 which is clamped by one of the clamping devices 5 touches the rotating cutting tool 2 for effecting the key cutting. An adjustable screw stopper 711 is provided on the front wall 71 of the lower slide, for stopping and controlling the proper movement of the upper slide 6, which is a prior known means. With this compression spring, the upper slide 6 can be maintained constantly in a duplicating position, and hence by merely operating handle wheel 75 in a counter clockwise direction or a clockwise direction with one hand, the lower slide 7 together with the upper slide 6 can be moved leftward or rightward along the two parallel lateral spaced guide posts 73 and 73' to a non-cutting position or a cutting position, for effecting the key duplicating.

Figure 5:
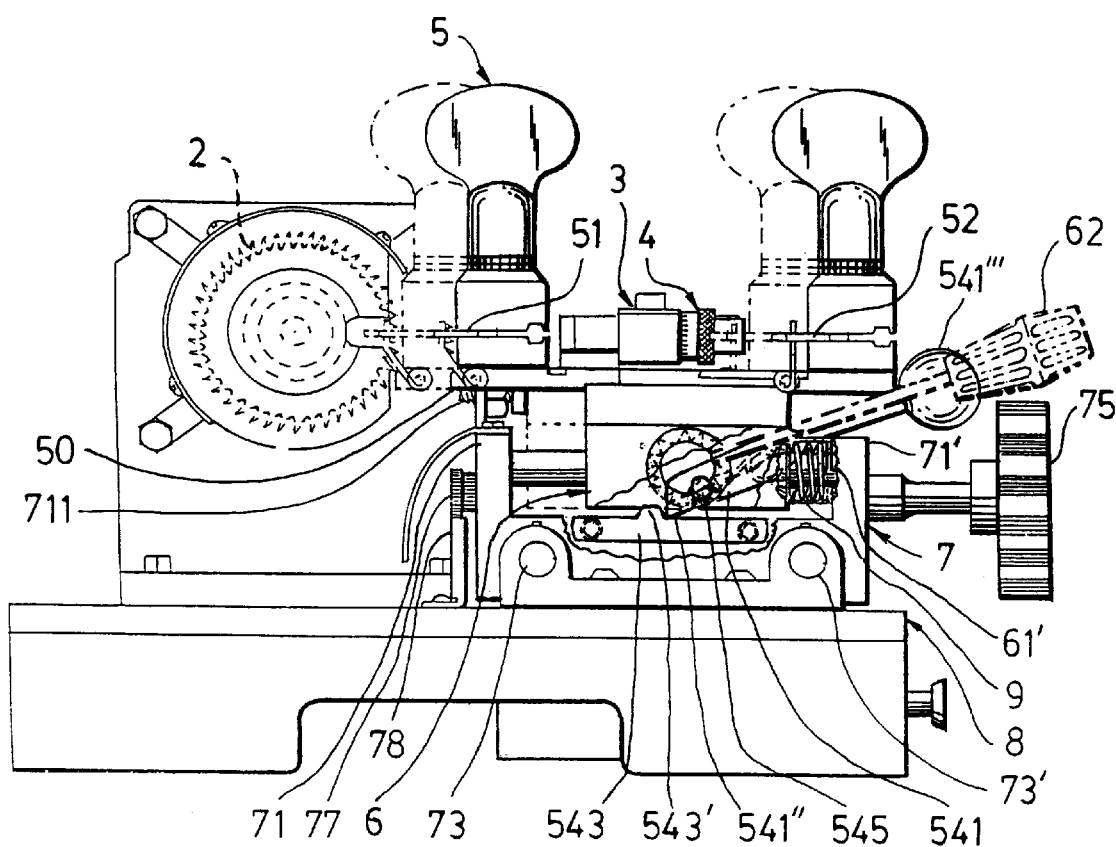
FIG. 5 is a partial sectional left side view of FIG. 1 in which a pair of clamping devices has been moved to a non-cutting position.
Figure 6:
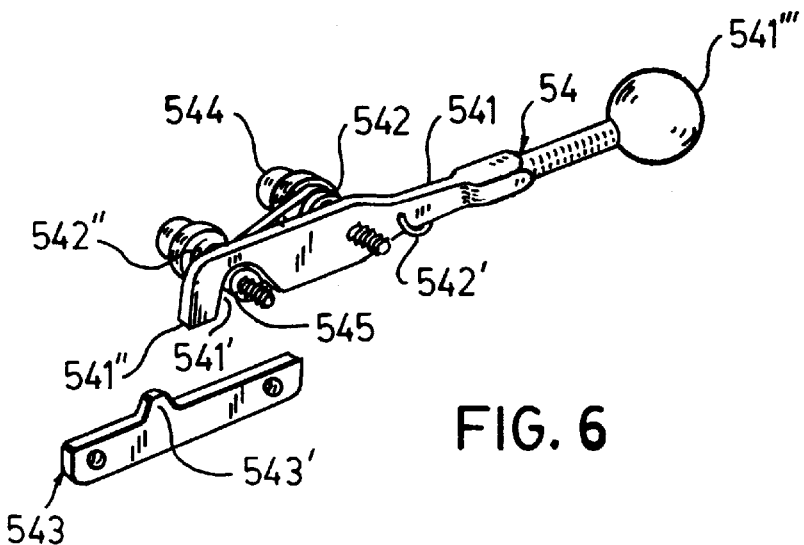
FIG. 6 is a partial exploded perspective view of a spring retainer in accordance with the present invention.

In order to clamp a key blank 51 or a key sample 52 on a pair of clamping devices 5 conveniently, a spring retainer 54 is provided between the upper slide 6 and the lower slide 7, for retaining the upper slide 6 together with the clamping devices 5 in a non-cutting position (as shown in FIG. 5). Referring to FIG. 6, the spring retainer 54 comprises a retaining rod 541, a torsion spring 542 and a retaining plate 543 etc. The retaining rod 541 is formed in a lever, and slantingly downward pivotally secured on the right side of the upper slide 6. The torsion spring 542 is provided on the pivot 544 of the retaining rod 541, and having one end 542' hooked at the rear portion of the retaining rod 541, and the other end 542" hooked at a stud 545 which is secured on the right side of the upper slide 6. With this torsion spring 542, a recess 541' formed on the front bottom of the retaining rod 541 can be engaged with the stud 545. By the formation of this recess, the front end 541" of the retaining rod is formed in a hook for locking. The retaining plate 543 is formed in a flat plate, and provided with an upward protrusion 543' on the top thereof, and mounted on the right side of the lower slide 7. The front end 541" of the retaining rod will be in a space in front of the upward protrusion 543' when the upper slide 6 is moved to a cutting position by means of the compression spring 9. By operating the handle 62 in a clockwise direction, the upper slide 6 together with the retaining rod 541 can be rearward moved away from a duplicating position until the front end 541" of the retaining rod 541 has been raised by the protrusion 543', and fallen into a space behind the protrusion 543' (as shown in FIG. 5), and locked by the protrusion 543', so that the upper slide 6 can be moved to a non-cutting position in which the compression spring 9 has been compressed by the upper slide 6. At this time, the user can operate the clamping devices 5 to clamp a key blank 51 and a key sample 52. After the key blank and the key sample have been clamped on the clamping devices, the rear end 541''' of the retaining rod is pressed for raising the front end 541" of the retaining rod by means of the effect of the lever, so that the front end 541" can be moved away from the protrusion 543' by means of the compression spring 9, and hence the upper slide 6 can be moved to a cutting position.

Figure 7:
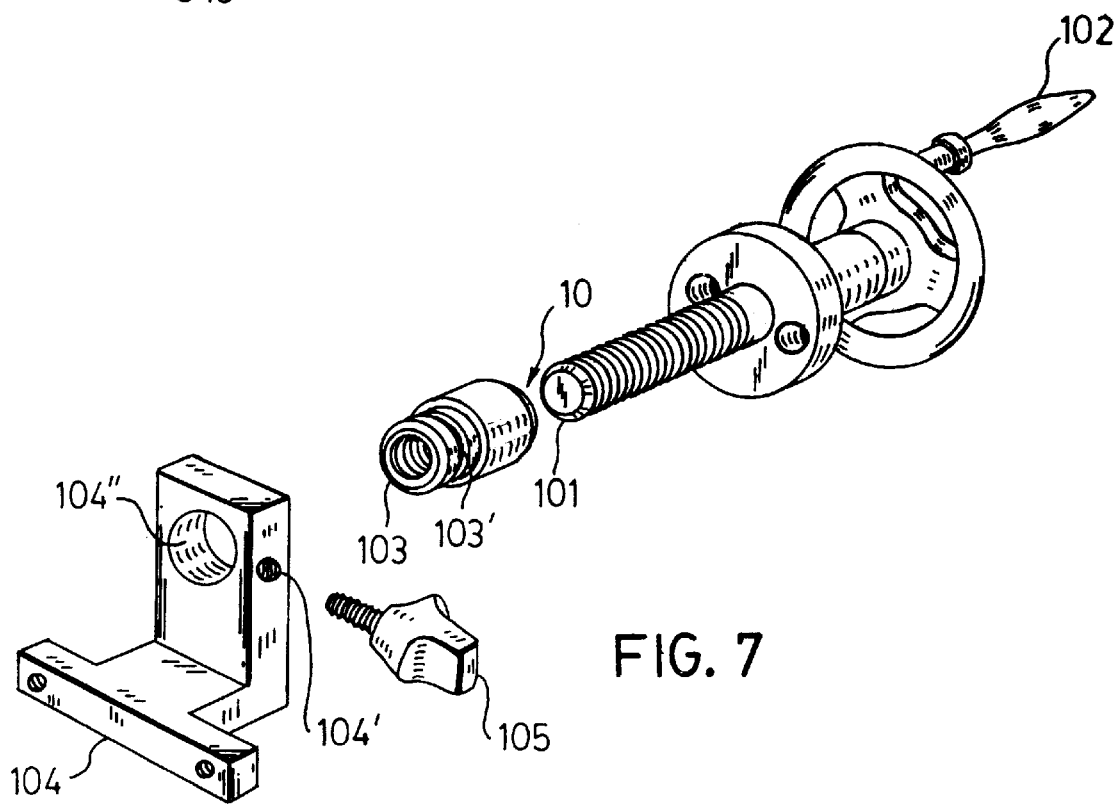
FIG. 7 is an exploded perspective view of a lead screw and nut assembly in accordance with the present invention.

Referring now to FIG. 7, the lead screw and nut assembly 10 comprises a lead screw 101, a hand wheel 102, a nut 103, a L-shaped member 104 and a screw 105 etc. The lead screw 101 is connected at one end to the hand wheel 102 which is horizontally laterally rotatably secured on the vertical support 32. The nut 103 is formed in a cylinder having a central threaded hole for thread engagement with the lead screw 101, and having an annular recess 103' formed at one end thereof for engagement with a screw 105 through a communicating threaded hole 104' provided on one side of the vertical wall of the L-shaped member 104 after the nut has been inserted into a circular through hole 104" provided on the vertical wall of the L-shaped member 104. The L-shaped member 104 is secured on the right side of the lower slide. By merely turning the hand wheel 102 in a counter clockwise direction or a clockwise direction with one hand, the lead screw 101 will be rotated in a counter clockwise direction or a clockwise direction in situ, and the nut 103 together with the upper and lower slides 6 and 7 will be moved leftward or rightward by means of the effect of the lead screw, for effecting a steady key cutting. In other words, in the present invention, a lead screw and nut assembly 10 is additionally used for effecting a steady key cutting, in order to avoid the above said hand strength control made by the new hand.

Figure 2:
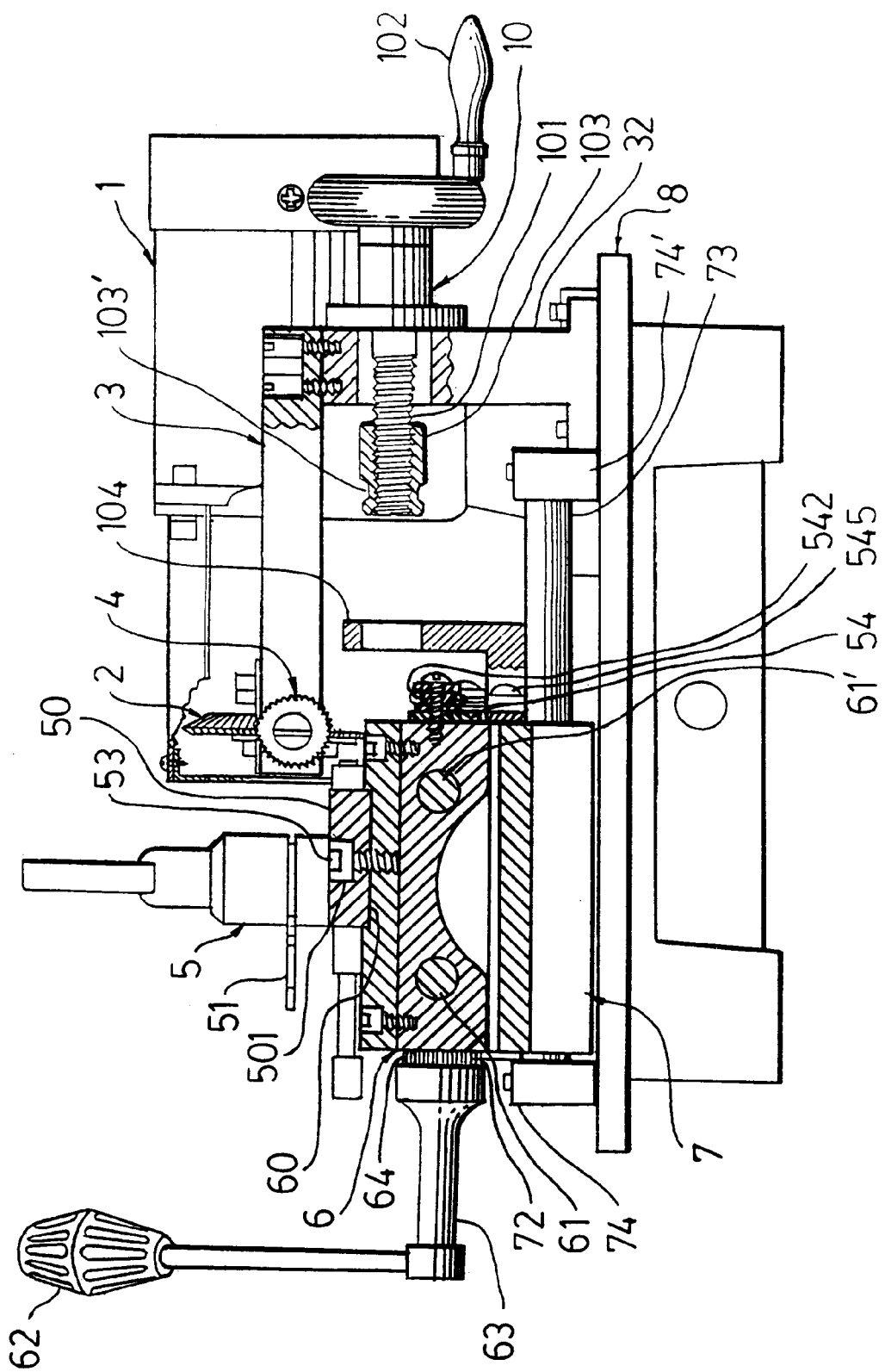
FIG. 2 is a partial sectional front view of FIG. 1.
Figure 3:
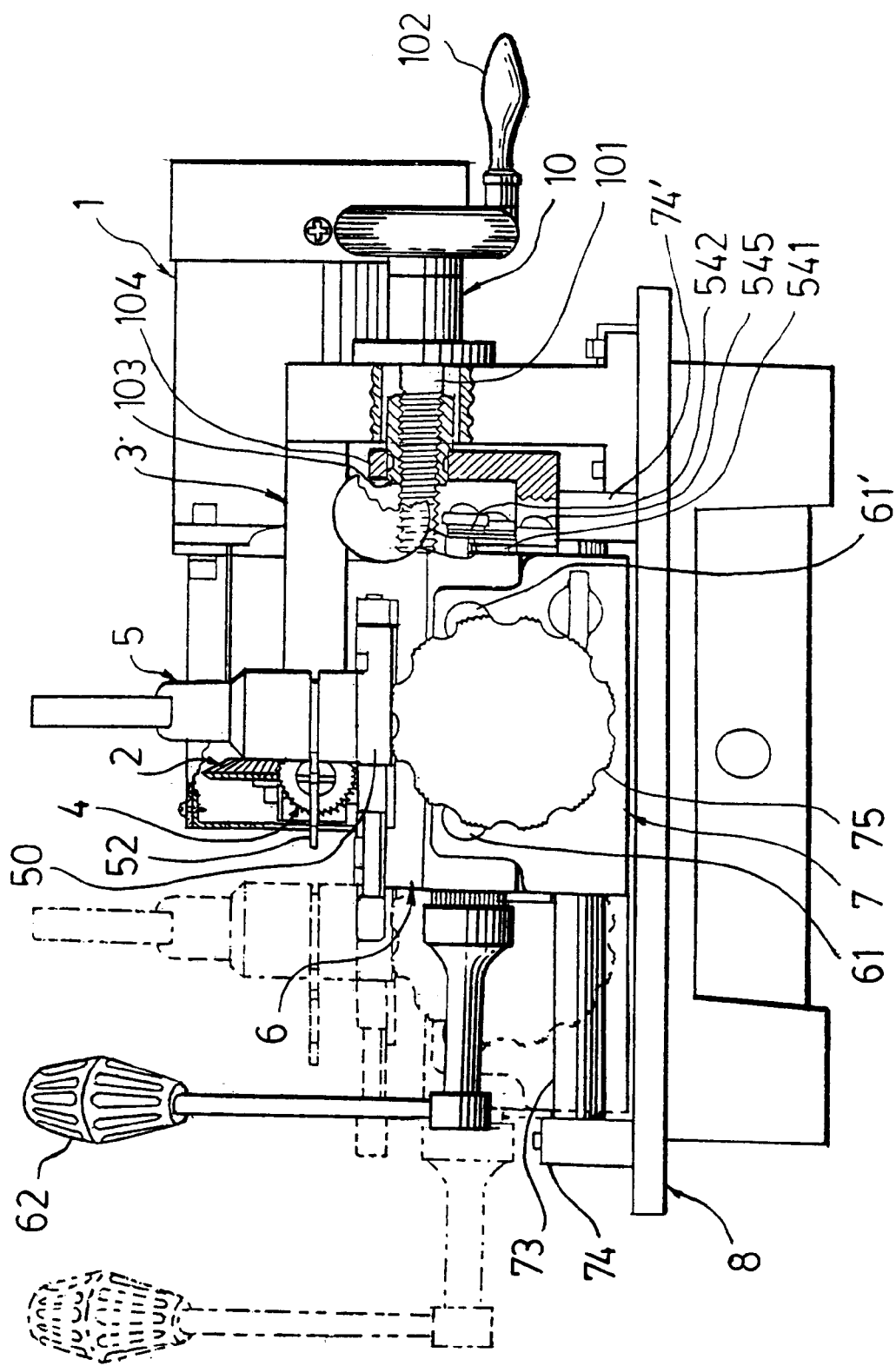
FIG. 3 is a partial sectional front view of FIG. 1 in which a pair of clamping devices has been moved to a cutting position.

In case the above said hand strength control is desired, the screw 105 can be disengaged from the annual recess 103' of the nut 103, and hence the L-shaped member 104 secured on the lower slide 7 can be leftward or rightward removed by turning the hand wheel 102 in a counter clockwise direction or a clockwise direction with the user's hand, as shown in FIG. 2.

I claim:

1. A key duplicating machine comprising:
   a motor having a shaft;
   a rotating cutting tool attached to the shaft;
   rack means adjacent the motor;
   a duplicating stylus attached to the rack means;
   an upper slide;
   a lower slide;
   clamping devices removably attached to the upper slide and the lower slide for clamping a key;
   a spring disposed between the upper slide and the lower slide for forcing the key into contact with the rotating cutting tool;
   a spring retainer disposed between the upper slide and the lower slide, the spring retainer comprising a retaining rod, a torsion spring and a retaining plate, the retaining rod slanting downwardly and being pivotally secured on a side of the upper slide and having a recess on the bottom thereof, and the retaining plate being disposed on a side of the lower slide and having a protrusion for locking a front end of the retaining rod when the upper slide and the said retaining rod are moved; and
   a stud secured on a side of the upper slide, the stud engaging the recess on the bottom of the retaining rod by means of the torsion spring.

2. A key duplicating machine comprising a rotating cutting tool directly secured on an output shaft of a driving motor; a duplicating stylus secured on a rack means secured on a substrate; a pair of clamping devices for clamping a key blank and a key sample, secured on a rectangular base releasably secured on an upper slide slidably secured on a lower slide slidably secured on said substrate; a compression spring arranged between said upper slide and a rear wall of said lower slide for constantly forcing said key blank to move toward and touch said rotating cutting tool for effecting a key cutting; a lead screw and nut assembly having a lead screw connected at one end to a hand wheel horizontally laterally rotatably secured on a vertical support provided on said rack means, and a nut formed in a cylinder having a central threaded hole for thread engagement with said lead screw, and having an annular recess formed at one end thereof for engagement with a screw through a communicating threaded hole provided on one side of a vertical wall of a L-shaped member secured on a right side of said lower slide after said nut has been inserted into a circular through hole provided on said vertical wall, for driving said key blank to move leftward or rightward by rotation of said hand wheel to effect a steady key cutting.

3. A key duplicating machine comprising:
   a rotating cutting tool directly secured on an output shaft of a driving motor;
   a duplicating stylus secured on a rack means secured on a substrate;
   a pair of clamping devices for clamping a blank key and a sample key, the clamping devices secured on a base releasably secured on an upper slide, said upper slide being slidably secured on a lower slide, said lower slide being slidably secured on said substrate;
   a compression spring arranged between said upper slide and a rear wall of said lower slide to urge said blank key to move toward and touch said rotating cutting tool to effect key cutting,
   wherein a spring retainer is provided between said upper slide and said lower slide, and comprising a retaining rod formed in a lever, and slantingly downward pivotally secured on the right side of said upper slide, and having a recess formed on front bottom thereof for engagement with a stud secured on said right side of said upper slide by means of a torsion spring provided on a pivot of said retaining rod having one end hooked at a rear potion of said retaining rod and the other end hooked at said stud; and retaining plate secured on the right side of said lower slide, and having an upward protrusion formed on top thereof for locking a front end of said retaining rod when said upper slide together with said retaining rod is moved rearward by turning a handle secured onto one end of a horizontal lateral spindle connected at the other end to a left side of said upper slide, in a clockwise direction until said hook has been raised by said protrusion and fallen into a space behind said protrusion, in order to enable said upper slide to move to a non-cutting machine.

4. A key duplicating machine comprising:
   a rotating cutting tool directly secured on an output shaft of a driving motor;
   a duplicating stylus secured on a rack means secured on a substrate;
   a pair of clamping devices for clamping a blank key and a sample key, the clamping devices secured on a rectangular base releasably secured on an upper slide, said upper slide being slidably secured on a lower slide, said lower slide being slidably secured on said substrate;
   a compression spring arranged between said upper slide and a rear wall of said lower slide for constantly forcing said blank key to move toward and touch said rotating cutting tool for effecting a steady key cutting,
   wherein said rectangular base is formed in a flat plate for partial engagement with a slot formed on said upper slide, and provided with a counter-boring at center portion thereof for securing said clamping devices and said rectangular base to said upper slide by means of a bolt.

5. The key duplicating machine as claimed in claim 2, wherein a spring retainer is provided between said upper slide and said lower slide, and comprising a retaining rod formed in a lever, and slantingly downward pivotally secured on the right side of said upper slide, and having a recess formed on front bottom thereof for engagement with a stud secured on said right side of said upper slide by means of a torsion spring provided on a pivot of said retaining rod having one end hooked at a rear portion of said retaining rod and the other end hooked at said stud; and a retaining plate secured on the right side of said lower slide, and having an upward protrusion formed on top thereof for locking a front end of said retaining rod when said upper slide together with said retaining rod is moved rearward by turning a handle vertically secured onto one end of a horizontal lateral spindle connected at the other end to a left side of said upper slide, in a clockwise direction until said hook has been raised by said protrusion and fallen into a space behind said protrusion, in order to enable said upper slide to move to a non-cutting machine.

6. The key duplication machine as claimed in claim 2, wherein said rectangular base is formed in a flat plate for partial engagement with a slot formed on said upper slide, and provided with a counter-boring at center portion thereof for securing said clamping devices and said rectangular base to said upper slide by means of a bolt.

* * * * *